(No Model.)
W. N. CANDEE.
AUTOMATIC TWINE HOLDER.
No. 436,301. Patented Sept. 9, 1890.
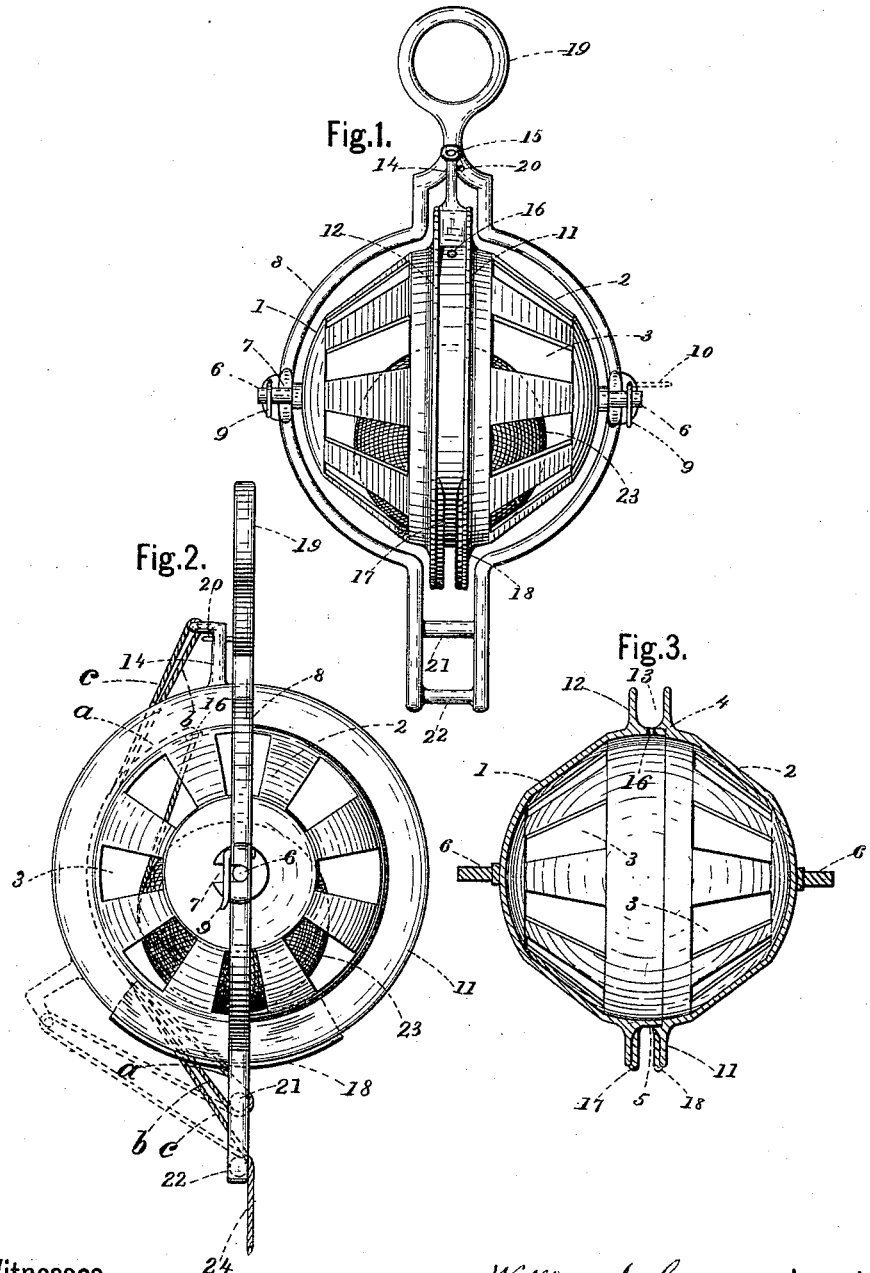
Witnesses.
Arthur J. Sangster.
Robert A. Geary
William N. Candee. Inventor.
By James Sangster, Attorney.

UNITED STATES PATENT OFFICE.

WILLIAM NORMAN CANDEE, OF BUFFALO, NEW YORK, ASSIGNOR TO THE NEW YORK TWINE HOLDER COMPANY, OF NEW YORK.

AUTOMATIC TWINE-HOLDER.

SPECIFICATION forming part of Letters Patent No. 436,301, dated September 9, 1890.

Application filed December 23, 1889. Serial No. 334,647. (No model.)

*To all whom it may concern:*

Be it known that I, WILLIAM NORMAN CANDEE, a citizen of the United States, residing in Buffalo, in the county of Erie and State of New York, have invented certain new and useful Improvements in Automatic Twine-Holders, of which the following is a specification.

My invention relates to certain improvements in that class of twine-holders that automatically take or wind up the remaining or surplus twine which has been drawn out during the act of using and breaking off a portion, and thereby drawing the surplus twine out of the way and in position so as to be within easy reach when required, all of which will be fully and clearly hereinafter described and claimed, reference being had to the accompanying drawings, in which—

Figure 1 is a front elevation of the twine-holder complete. Fig. 2 is a side elevation, and Fig. 3 is a central cross-section through the two halves composing the shell or case for holding the ball of twine, showing how the two halves come together.

The twine-holding case is made in two halves 1 and 2, being preferably made of cast-iron with a series of openings 3, so as to expose the ball of twine within. The half 2 is provided with an annular recess 4, into which the rim 5 fits when the two are put together, as shown in Fig. 2. To the outside center of each half of the case is a journal 6, which fits in the bearings 7 in the supporting-frame 8. The holder or case when put together, as shown in Fig. 3, is placed so that its journals drop into the bearings 7, and then the fastening-arms 9, which are pivoted so as to turn on the supporting-frame, as shown in Figs. 1 and 2, are turned down over the journals, so as to prevent them from coming out. One of these fastening-arms 9 is shown by the dotted lines 10 in its position when turned up out of the way, so that the holder can be taken out, as shown in Fig. 1. On each half of the case is a surrounding rib or flange 11 and 12, so as to leave an annular recess 13 between them surrounding the case. Within this annular recess is a hook-shaped portion 14, either formed in one piece with or attached to one of the cases. The hook end of the portion 14 is provided with a perforation 15, (shown in Fig. 1,) and at the front of the portion 14 is a perforation 16, which opens through the bottom of the recess 13 into the case. Below or nearly opposite the hook portion 14 is a weighted portion 17 and 18. I have shown this weighted portion as consisting of an inside addition to the rib 11 and 12; but it may be a solid portion between the two ribs, if desired. The object in making it as shown is to leave an opening between the two ribs for the twine to lie in, as shown in Fig. 2. The object of this weighted portion is to provide the means to turn the case on its axis, so as to bring the portion 14 up in the position shown in Figs. 1 and 2. At the top of the supporting-frame portion 8 is a ring 19, by which it is suspended, and below the suspending-ring is a forwardly-projecting spring portion 20, the object of which is to catch and hold by a slight friction the hook portion 14 as it is carried up when the twine is released. At the lower end of the supporting portion 8 are two cross-bars 21 and 22, over which the twine passes, the object of which will be more clearly hereinafter shown in the following description of the operation of the device.

The ball of twine 23 being put into the case and the end of the twine passed through the hole 16, the two halves of the case are now put together, as above mentioned, and then in place in the supporting-frame 8, to which they are secured by the pivoted arms 9. The end 24 of the twine (see Fig. 2) that comes from the ball 23 within the case is passed down around the case in the groove or recess 13, and designated as the portion *a*, and from thence around the cross-bar 21, and then passes up through the groove 13 and designated as the portion *b*, and from thence it passes up through the hole 15 and then down around through the grooves 13, designated as the portion *c*, and from thence it passes through the opening between the bars 21 and 22 down around the bar 22, where it hangs as the end 24 in a convenient position to be reached when required for use. When using the twine, the end 24 is pulled downward, which operation turns the twine-case nearly one-half way around, until the hook portion 14 strikes against the bar 21 and prevents it from turning any farther, after which the ball 23 begins to unwind and the twine slips through the holes 15 and 16 and over the cross-bars 21 and 22 until enough twine has been drawn off for use. When the required length of twine is broken off, the weighted portion 17 and 18 causes the case to regain its former or normal position, as shown in Fig. 2, and as the momentum caused by the weight carries the hook portion 14 clear up the spring portion 20 holds at that point until moved by the use of the twine. It will be noticed that by the above arrangement of the twine the hook portion 14 moves from its lowest position nearly a half-revolution up to its upward position, and in doing so it will draw up a portion of twine nearly three times the length of its own movement.

In practice the twine is readily put in place, as above described, by letting the end 24 project a short distance through the hole 16 and turning the case so that the hook portion 14 projects through between the bars 21 and 22, and then by putting the end 24 of the twine through the perforation 15, and a sufficient length of the twine being pulled through and the case and weight released so as to bring it back to its normal position, it will draw the twine up in the position, as above described.

I claim as my invention—

In an automatic twine-holder, the combination of a holding-case composed of two halves, each having surrounding ribs 11 and 12, a hole for the twine to pass out through and adapted to fit together, so as to leave a surrounding groove 13 between the ribs 11 and 12, a perforated hook portion 14 at the top of the case and a weighted portion below, a frame in which the case is mounted so as to oscillate and by which it is suspended, and cross-bars 21 and 22 at the lower portion of the frame, for the purposes described.

WILLIAM NORMAN CANDEE.

Witnesses:
CORA J. BLAKELEY,
ARTHUR J. SANGSTER.